(12) United States Patent
Matsui et al.

(10) Patent No.: US 8,876,296 B2
(45) Date of Patent: Nov. 4, 2014

(54) PORTABLE ELECTRONIC APPARATUS AND DISPLAY CONTROL METHOD

(75) Inventors: Kenichi Matsui, Yokohama (JP); Jouji Yoshikawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 335 days.

(21) Appl. No.: 13/202,378

(22) PCT Filed: Feb. 25, 2010

(86) PCT No.: PCT/JP2010/053004
§ 371 (c)(1),
(2), (4) Date: Aug. 19, 2011

(87) PCT Pub. No.: WO2010/098405
PCT Pub. Date: Sep. 2, 2010

(65) Prior Publication Data
US 2011/0300911 A1  Dec. 8, 2011

(30) Foreign Application Priority Data

Feb. 25, 2009  (JP) .................................. 2009-043194

(51) Int. Cl.
G03B 21/00 (2006.01)
H04N 9/31 (2006.01)
G03B 17/54 (2006.01)

(52) U.S. Cl.
CPC ........... *H04N 9/3194* (2013.01); *H04N 9/3173* (2013.01); *G03B 21/00* (2013.01); *G03B 17/54* (2013.01)
USPC ........... 353/39; 353/121; 455/566; 455/556.1

(58) Field of Classification Search
CPC .............. H04M 1/026; H04M 1/0272; H04M 1/27455; H04N 9/3176; G03B 29/00
USPC .................. 353/39, 121, 122; 455/566, 556.1
See application file for complete search history.

(56) References Cited

U.S. PATENT DOCUMENTS 7,883,221 B2 * 2/2011 Nozaki et al. ................. 353/122
8,024,007 B2 * 9/2011 Roberts et al. ................ 455/566
(Continued)

FOREIGN PATENT DOCUMENTS

| JP | 2001-197167 A | 7/2001 |
|----|---------------|--------|
| JP | 2002-007027 A | 1/2002 |

(Continued)

OTHER PUBLICATIONS

Japanese Office Action mailed Feb. 26, 2013 for Application No. 2009-043194.

(Continued)

*Primary Examiner* — William C Dowling
(74) *Attorney, Agent, or Firm* — Lowe Hauptman & Ham, LLP

(57) ABSTRACT

To carry out display control with a projector unit and a display unit in further consideration of user needs, a portable electronic apparatus of the invention includes the display unit that displays given display data, the projector unit that projects at least a part of the display data, a storage unit that stores therein the display data including at least self-state information indicative of a state of the own apparatus, and a control unit that makes the display unit display the display data stored in the storage unit including the self-state information and makes the projector unit project the display data stored in the storage unit without including the self-state information.

14 Claims, 13 Drawing Sheets

(56) References Cited

U.S. PATENT DOCUMENTS

| | | | | |
|---|---|---|---|---|
| 8,285,256 | B2* | 10/2012 | Gupta et al. | 455/412.2 |
| 8,320,971 | B2* | 11/2012 | Roberts et al. | 455/566 |
| 2008/0259289 | A1* | 10/2008 | Nozaki et al. | 353/70 |
| 2009/0033785 | A1* | 2/2009 | Fujinawa et al. | 348/333.01 |
| 2009/0143098 | A1* | 6/2009 | Shiono | 455/556.1 |

FOREIGN PATENT DOCUMENTS

| | | |
|---|---|---|
| JP | 2005-208802 A | 8/2005 |
| JP | 2006-033357 A | 2/2006 |
| JP | 2006-067121 A | 3/2006 |
| JP | 2006-084531 A | 3/2006 |
| JP | 2007-047758 A | 2/2007 |
| JP | 2007-074651 A | 3/2007 |
| JP | 2008-191406 A | 8/2008 |
| JP | 2009-003428 A | 1/2009 |

OTHER PUBLICATIONS

International Search Report for PCT/JP2010/053004 mailed Apr. 6, 2010.

* cited by examiner

FIG.6

| FILE OR FUNC-TION | PICTO-GRAM AREA | SOFT-KEY AREA | SUB-MENU | MAIN 1 | MAIN 2 | ...... | MAIN n |
|---|---|---|---|---|---|---|---|
| Power Point | LCD | LCD | BOTH | PROJEC-TOR *1 | LIQUID CRYSTAL *2 | | |
| PDF | LCD | LCD | BOTH | PROJEC-TOR *3 | LIQUID CRYSTAL *4 | | |

| STANDBY | PROJEC-TOR | LCD | LCD | LCD*5 | PROJEC-TOR *6 |
|---|---|---|---|---|---|
| E-mail | LCD | LCD | BOTH | LCD*7 | PROJEC-TOR *8 |
| BROWS-ER | LCD | LCD | BOTH | PROJEC-TOR | |
| TELEVI-SION | PROJEC-TOR *9 | LCD | LCD | PROJEC-TOR *10 | |

*1··· SLIDE PORTION
*2··· NOTE PORTION
*3··· MAIN BODY
*4··· PAGE VIEW
*5··· BACKGROUND
*6··· ANNOUNCEMENT DISPLAY
*7··· SUBJECTS
*8··· MAIN BODY
*9··· TIME
*10··· TELEVISION SCREEN

FIG.11
・STILL IMAGE DISPLAY
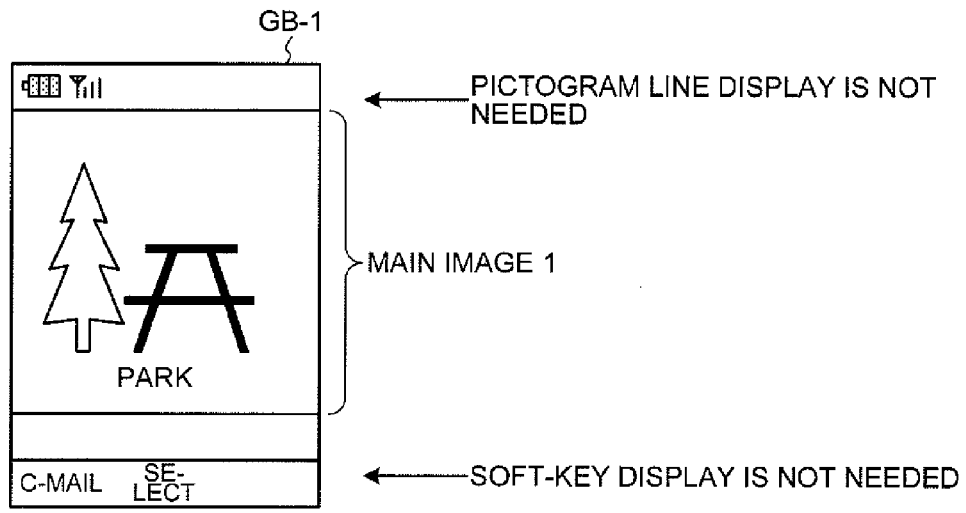
・2-SCREEN TELEVISION DISPLAY
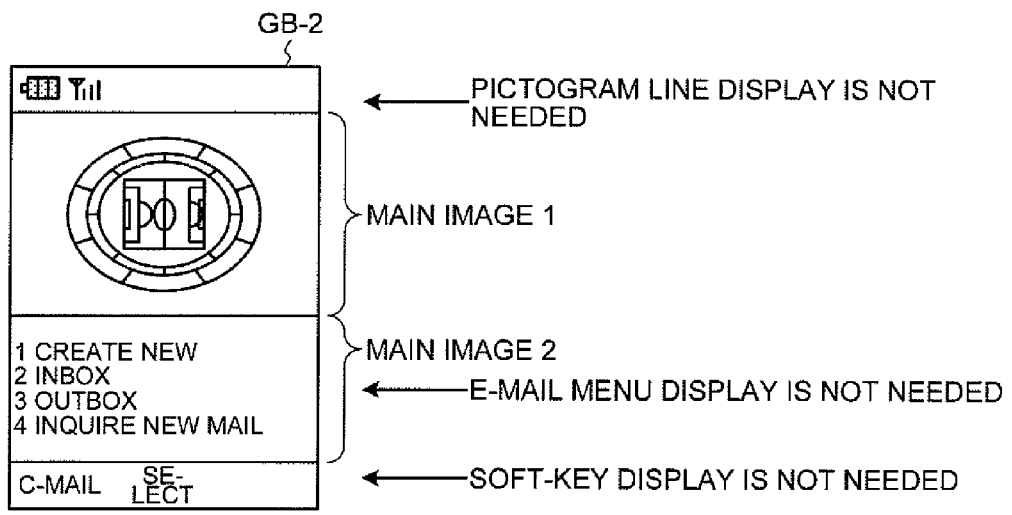

PORTABLE ELECTRONIC APPARATUS AND DISPLAY CONTROL METHOD

CROSS-REFERENCE TO RELATED APPLICATION

This application is a National Stage of PCT international application Ser. No. PCT/JP2010/053004 filed on Feb. 25, 2010, which is based upon and claims the benefit of priority from Japanese Patent Application No. 2009-43194, filed on Feb. 25, 2009.

TECHNICAL FIELD

The present invention relates to a portable electronic apparatus having a projector function, and to a display control method.

BACKGROUND ART

Nowadays, portable projector apparatuses are appearing on the market and terminals with a projector built-in are being developed.

For example, an electronic device disclosed in Patent Literature 1, a video projection device disclosed in Patent Literature 2, and a portable device disclosed in Patent Literature 3 detect an open/closed state of the terminal to switch between the display on a display unit included in the terminal and the projection by a projector. An electronic device with a projector disclosed in Patent Literature 4 turns off the display unit when carrying out the projection by the projector. Furthermore, a cellular phone disclosed in Patent Literature 5 selects the display unit or the projector based on content.

CITATION LIST

Patent Literature

Patent Literature 1: Japanese Patent Application Laid-open No. 2005-208802
Patent Literature 2: Japanese Patent Application Laid-open No. 2006-33357
Patent Literature 3: Japanese Patent Application Laid-open No. 2006-67121
Patent Literature 4: Japanese Patent Application Laid-open No. 2007-74651
Patent Literature 5: Japanese Patent Application Laid-open No. 2001-197167

DISCLOSURE OF INVENTION

Problem to be Solved by the Invention

In the conventional portable terminals (in Patent Literatures 1 to 5), however, it is assumed only to use either one of the projector unit or the display unit.

In other words, the terminals disclosed in Patent Literatures 1 to 4 carry out switching control between the display unit and the projector by the open/closed state of the terminal. The cellular phone disclosed in Patent Literature 5 selects a small liquid crystal display or a large screen corresponding to the size of the content.

It is an object of the present invention to provide a portable electronic apparatus and a display control method for carrying out display control with a projector unit and a display unit in further consideration of user needs.

SUMMARY OF THE INVENTION

According to an aspect of the present invention, a portable electronic apparatus includes: a display unit that displays given display data; a projector unit that projects at least a part of the display data; a storage unit that stores therein the display data including at least self-state information indicative of a state of the own apparatus; and a control unit that makes the display unit display the display data stored in the storage unit including the self-state information and makes the projector unit project the display data stored in the storage unit without including the self-state information.

According to another aspect of the present invention, the portable electronic apparatus further includes a power supply unit that supplies power. The self-state information includes battery level display information indicative of a remaining amount of the power of the power supply unit. The control unit makes the display unit display the display data including the battery level display information and makes the projector unit project the display data without including the battery level display information.

According to another aspect of the present invention, the portable electronic apparatus further includes a wireless communication unit that carries out wireless communications. The self-state information further includes wireless connectivity information indicative of wireless connectivity of the wireless communication unit. The control unit makes the display unit display the display data including the wireless connectivity information and makes the projector unit project the display data without including the wireless connectivity information.

According to another aspect of the present invention, the portable electronic apparatus further includes an operating unit that is key-operated by a user. The self-state information further includes soft-key display information indicative of an operation available in the operating unit. The control unit makes the display unit display the display data including the soft-key display information and makes the projector unit project the display data without including the soft-key display information.

According to another aspect of the present invention, the storage unit includes a display memory unit for forming the display data to be displayed and/or projected on the display unit and/or by the projector unit. The display memory unit includes a sub-memory unit for updating the self-state information as needed and a main-memory unit for updating to draw the display data other than the self-state information stored in the sub-memory unit. The control unit makes the projector unit project the display data stored in the main-memory unit.

According to another aspect of the present invention, the storage unit further includes a superposition memory unit for forming the display data combined by superposing at least a part of the display data stored in the display memory unit to be displayed on the display unit and/or by the projector unit. The control unit makes the projector unit project the display data stored in the superposition memory unit.

According to another aspect of the present invention, the control unit makes the projector unit project the display data stored in either the main-memory unit or the superposition memory unit selected by a user.

According to another aspect of the present invention, the control unit updates the display data projected by the projector unit when the display data stored in the main-memory unit is updated while the display data is being projected by the projector unit. The control unit does not update the display data projected by the projector unit even if the self-state information stored in the sub-memory unit is updated without the display data stored in the main-memory unit being updated.

According to another aspect of the present invention, the portable electronic apparatus further includes a wireless communication unit that carries out wireless communications. The self-state information includes wireless connectivity information indicative of wireless connectivity of the wireless communication unit. The control unit does not change the display data projected by the projector unit even if the wireless connectivity information stored in the sub-memory unit is updated by a change in the wireless connectivity of the wireless communication unit into within or out of service range while the display data is being projected by the projector unit.

According to another aspect of the present invention, the portable electronic apparatus further includes an open/close detection switch that detects a variation in an open/closed state of the portable electronic apparatus, and an operating unit that is key-operated by a user. The self-state information further includes soft-key display information indicative of an operation available in the operating unit. The control unit changes the soft-key display information stored in the sub-memory unit when the variation in the open/closed state is detected by the open/close detection switch. The control unit does not change the display data projected by the projector unit even if the soft-key display information stored in the sub-memory unit is changed by the variation in the open/closed state being detected by the open/close detection switch while the display data is being projected by the projector unit.

According to another aspect of the present invention, the portable electronic apparatus further includes a power supply unit that supplies power. The self-state information includes battery level display information indicative of a remaining amount of the power of the power supply unit. The control unit makes the projector unit project the display data including the updated battery level display information when the battery level display information stored in the sub-memory unit is updated by fluctuation in the remaining amount of the power of the power supply unit while the display data is being projected by the projector unit.

According to another aspect of the present invention, the storage unit further includes a projection destination selection table that stores therein projection destination selection information in which a projection destination of the display data is set to either the display unit or the projector unit, or to both of the display unit and the projector unit. The control unit causes the display data to be displayed on the projection destination set in the projection destination selection information stored in the projection destination selection table.

According to another aspect of the present invention, resolution of the display unit and resolution of the projector unit are different from each other, and the display unit has a wide area including a larger number of pixels at least in one direction than the projector unit. The control unit causes the self-state information to be displayed on at least a part of the wide area of the display unit.

According to another aspect of the present invention, the wireless communication unit carries out wireless communications in a CDMA 2000_1x system.

According to another aspect of the present invention, a display control method is executed in a portable electronic apparatus comprising a display unit, a projector, a storage unit, and a control unit. The display control method includes, under control performed by the control unit, storing display data including at least self-state information indicative of a state of the own apparatus in the storage unit, displaying on the display unit the display data stored in the storage unit including the self-state information; and projecting by the projector unit the display data stored in the storage unit without including the self-state information.

Effect of the Invention

The present invention has an effect of providing a portable electronic apparatus and a display control method for carrying out the display control with the projector unit and the display unit in further consideration of the user needs.

BRIEF DESCRIPTION OF DRAWINGS

FIG. 6 is an exemplary diagram for explaining an example of a projection destination selection table;

FIG. 11 is an exemplary diagram illustrating an example of a virtual display screen;

DESCRIPTION OF EMBODIMENTS

An exemplary embodiment of the present invention will be described in detail with reference to the accompanying drawings hereinafter. However, the present invention is not limited by the following explanation. The constituent elements in the following description include those that can be easily assumed by a person of ordinary skill in the art, those that are substantially the same, and those of so-called equivalents. For example, in the followings, while a cellular phone is exemplified as a portable electronic apparatus, the subject to which the invention is applied is not limited to the cellular phone.

For example, the invention can be applied to a personal handyphone system (PHS), a personal digital assistant (PDA), a portable navigation device, a laptop computer, a portable game machine, a portable television, and the like.

Figure 1:
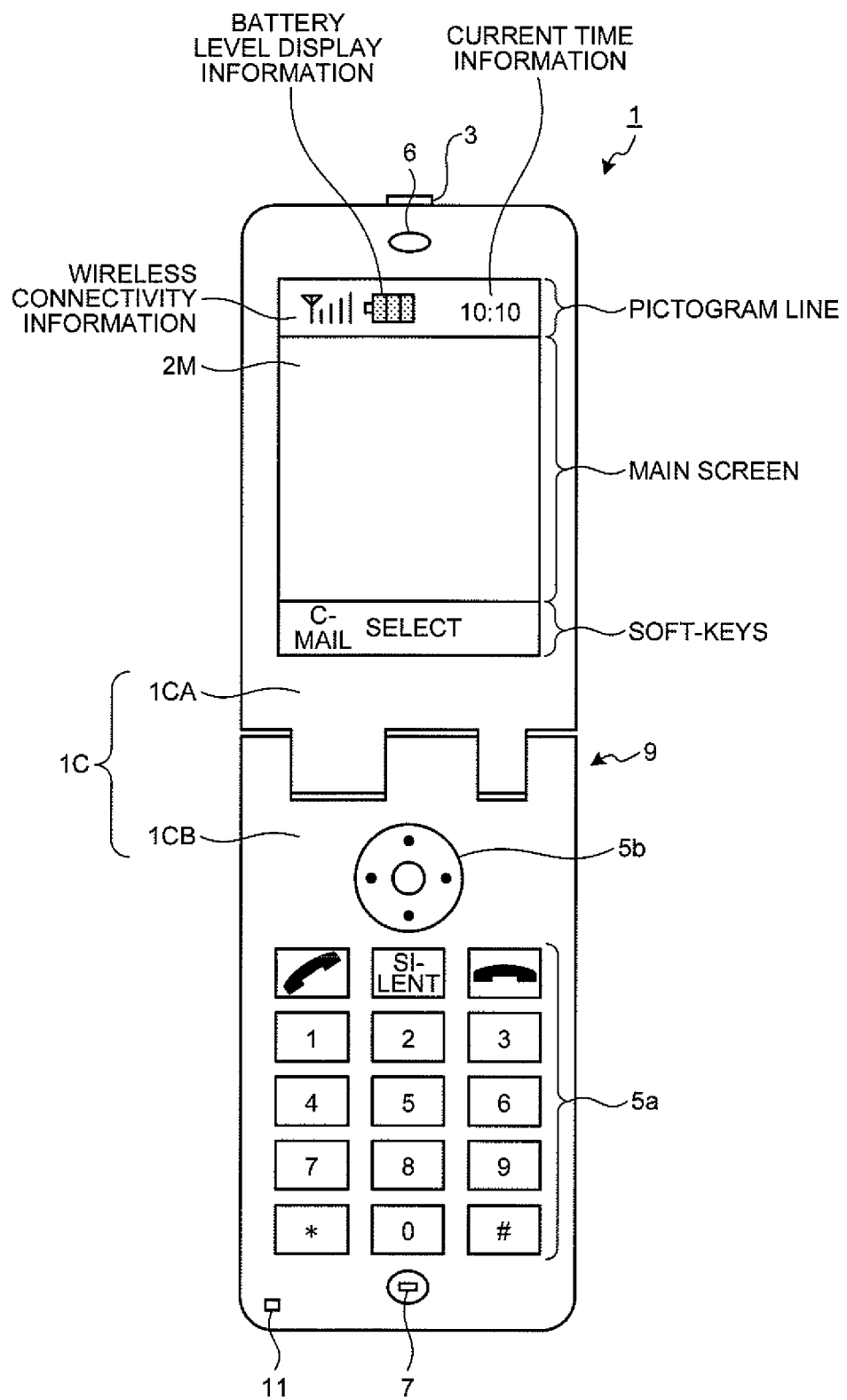
FIG. 1 is an exemplary front elevational view of a portable electronic apparatus according to an embodiment of the invention.
Figure 2:
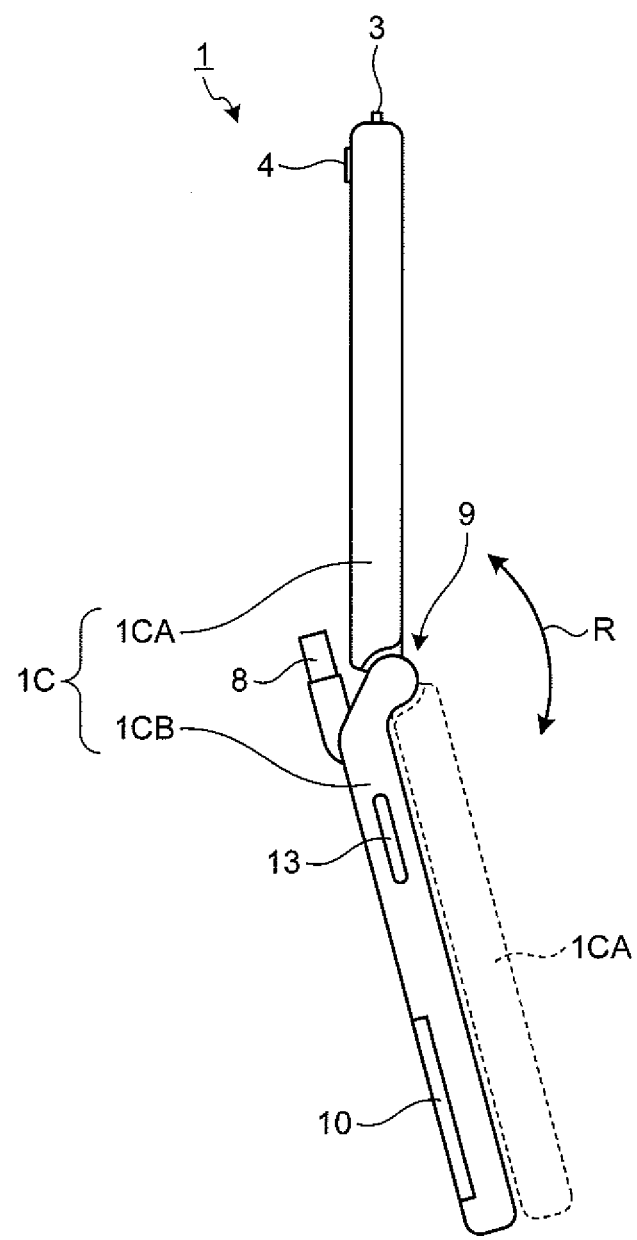
FIG. 2 is an exemplary side view of the portable electronic apparatus according to the embodiment.
Figure 3:
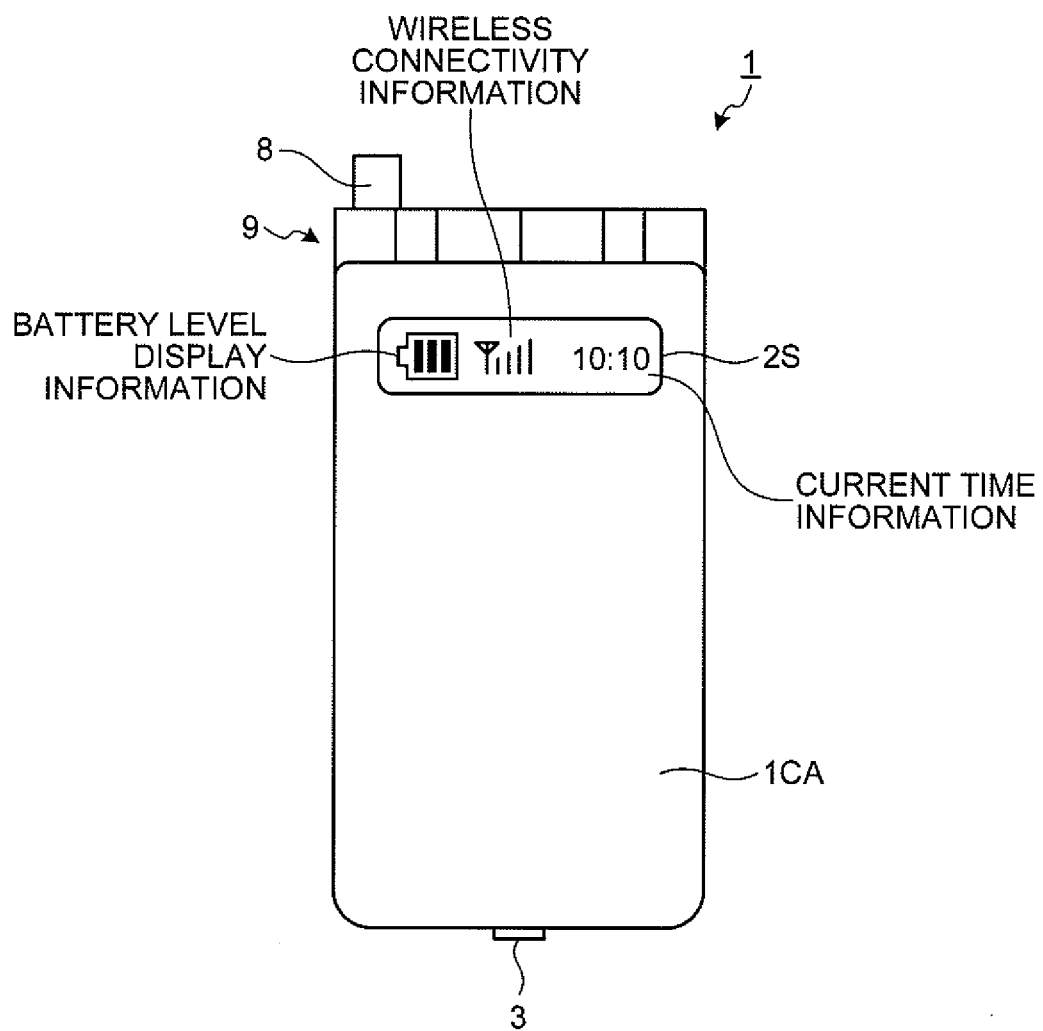
FIG. 3 is an exemplary diagram illustrating the portable electronic apparatus in a closed state according to the embodiment.

FIG. 1 is an exemplary front elevational view of a portable electronic apparatus according to an embodiment. FIG. 2 is an exemplary side view of the portable electronic apparatus according to the present embodiment. FIG. 3 is an exemplary diagram illustrating the portable electronic apparatus in a closed state according to the present embodiment. The configuration of the portable electronic apparatus will be described first. This portable electronic apparatus 1 is a cellular phone including a projector function and a wireless communication function. The portable electronic apparatus 1 is a flip type cellular phone whose case 1C is configured with a first case 1CA and a second case 1CB in an openable and closable manner. FIGS. 1 and 2 depict the portable electronic apparatus 1 in an opened state and FIG. 3 depicts the portable electronic apparatus 1 in a closed state.

The configuration of the portable electronic apparatus 1 will be explained first. The first case 1CA includes a main display 2M depicted in FIG. 1 as a display unit 2. Furthermore, the first case 1CA includes a sub-display 2S depicted in FIG. 3 as the same display unit 2. The main display 2M and the sub-display 2S are disposed on the respective opposing surfaces of the first case 1CA and are configured such that a user can see the sub-display 2S when the portable electronic apparatus 1 is closed. In other words, the display unit 2 is configured with the main display 2M that is concealed when the case 1C of the portable electronic apparatus 1 is closed and is exposed when the apparatus is opened and with the sub-display 2S that is exposed to the outside of the case 1C even when the case 1C is closed. The main display 2M and the sub-display 2S are configured, for example, with display devices such as a liquid crystal display panel and an organic electro luminescence (EL) panel, and display images in response to an image signal sent from a control unit 14 (image signals of standby images, menu images, and such including still images and moving images).

The main display 2M displays a pictogram line (status information area) including a remaining amount of a battery cell (battery level display information), a reception condition of radio waves (wireless connectivity information), current time information, and the like of the portable electronic apparatus 1 as given images of given display data. The main display 2M displays a main screen such as a standby image (a wall paper, an idle screen, or a desktop) while the portable electronic apparatus 1 is in a state of standing by for reception or in a state of waiting for various applications to be started up. The main display 2M displays soft-keys such as menu images used for assisting the operation of the portable electronic apparatus 1. While the portable electronic apparatus 1 is in a closed state as depicted in FIG. 3, the sub-display 2S displays the pictogram line (status information area) including the remaining amount of the battery cell (the battery level display information), the reception condition of radio waves (the wireless connectivity information), the current time information, and the like of the portable electronic apparatus 1. The first case 1CA includes a speaker 6 that produces voice during a call on the portable electronic apparatus 1. The first case 1CA further includes a projector unit 3. The projector unit 3 includes a lens and the like that projects an enlarged image onto an indoor or outdoor wall, a fence, or the like using the light such as the illumination of a backlight that illuminates from behind the display screen of the display unit 2 displaying the display data. The first case 1CA further includes a camera 4 including a function of taking a still image and moving images. The camera 4 is, for example, a video camera, a digital camera, or a web camera that includes a charged coupled device or a solid-state image sensing device such as a charge coupled device (CCD) and a complementary metal oxide semiconductor (CMOS).

The second case 1CB includes, as an operating unit 5, a plurality of operation keys 5a for entering a telephone number of an intended party and for entering letters when creating e-mail and such. The second case 1CB further includes cursor and OK keys 5b for easily executing the selection of a projection destination of display data and such, the selection and decision of menus displayed as soft-keys, the scroll of the screen, and the like. The second case 1CB includes a microphone 7 that receives voice during a call on the portable electronic apparatus 1. The second case 1CB includes antennas as a wireless communication unit 8 that are used for transmission and reception between the portable electronic apparatus 1 and base stations. As depicted in FIG. 2, the second case 1CB further includes a power supply unit 10 that supplies power to the portable electronic apparatus 1. The second case 1CB includes an open/close detection switch 11. The open/close detection switch 11 includes a switch that checks whether the first case 1CA and the second case 1CB are in close contact with each other (being closed) as depicted in FIG. 3. More specifically, when the portable electronic apparatus 1 is closed as depicted in FIG. 3, the switch is turned on and, when the portable electronic apparatus 1 is opened as depicted in FIGS. 1 and 2, the switch is turned off, thereby detecting an open/closed state. The open/close detection switch 11 may detect the open/closed state by detecting a resistance value that is varied by a magnetic field. The resistance value here may be detected by an MR sensor (magnetic sensor) provided at a position facing a magnet (not depicted) provided to the first case 1CA in a closed state. The second case 1CB may further include a built-in tilt detection unit 12 such as a tri-axial acceleration sensor having a function to detect the tilt of the portable electronic apparatus 1.

The operating unit 5 is configured to include the operation keys 5a and the cursor and OK keys 5b depicted in FIG. 1. The operating keys 5a are configured with a plurality of keys, and the cursor and OK keys 5b are configured with a plurality of switches. The keys and the switches are assigned with various functions required to operate the portable electronic apparatus 1 such as power, call, numerals, letters, directions, decision, and send. When the operation keys 5a and the cursor and OK keys 5b are operated by the user, the operation keys 5a and the cursor and OK keys 5b generate signals assigned to the respective operations. The generated signals are then fed to a main CPU 14a as instructions of the user.

As depicted in FIG. 2, in the present embodiment, on one side portion of the second case 1CB (one of the surfaces roughly orthogonal to the surface in which the operation keys 5a and the cursor and OK keys 5b are provided), a communication terminal 13 is included. The communication terminal 13 is used when storing information from the outside of the second case 1CB in a storage unit provided in the second case 1CB or retrieving the information stored in the storage unit to the outside of the second case 1CB. The information stored in the storage unit is, for example, software used for controlling the portable electronic apparatus 1, image data, audio data, or the like.

As depicted in FIG. 2, the first case 1CA and the second case 1CB are coupled by a hinge 9. This allows the first case 1CA and the second case 1CB to be foldable in directions indicated by the arrow R in FIG. 2 centered on the hinge 9.

Figure 4:
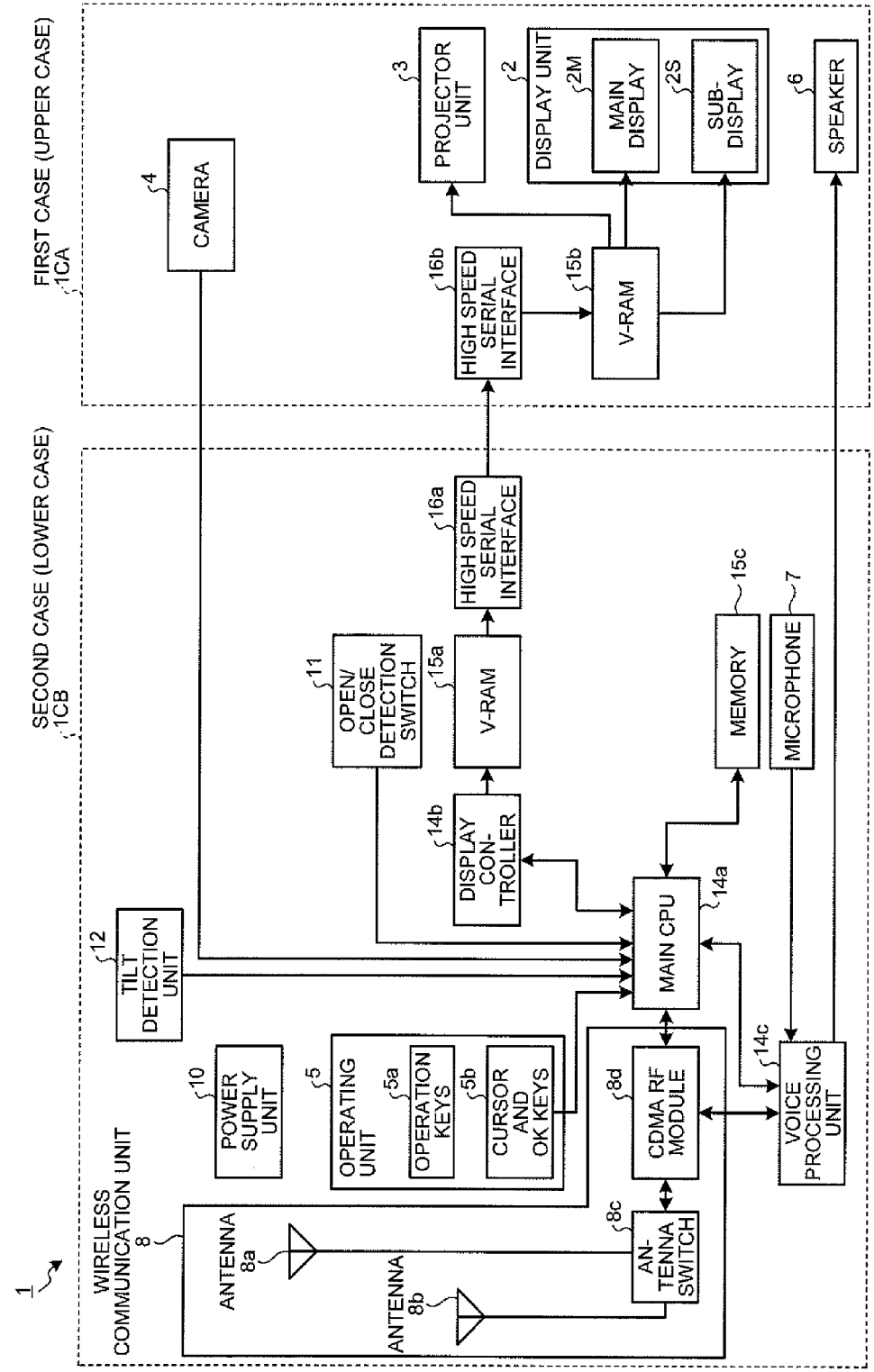
FIG. 4 is an exemplary block diagram illustrating an example of functions of the portable electronic apparatus divided into a first case and a second case according to the embodiment.
Figure 5:
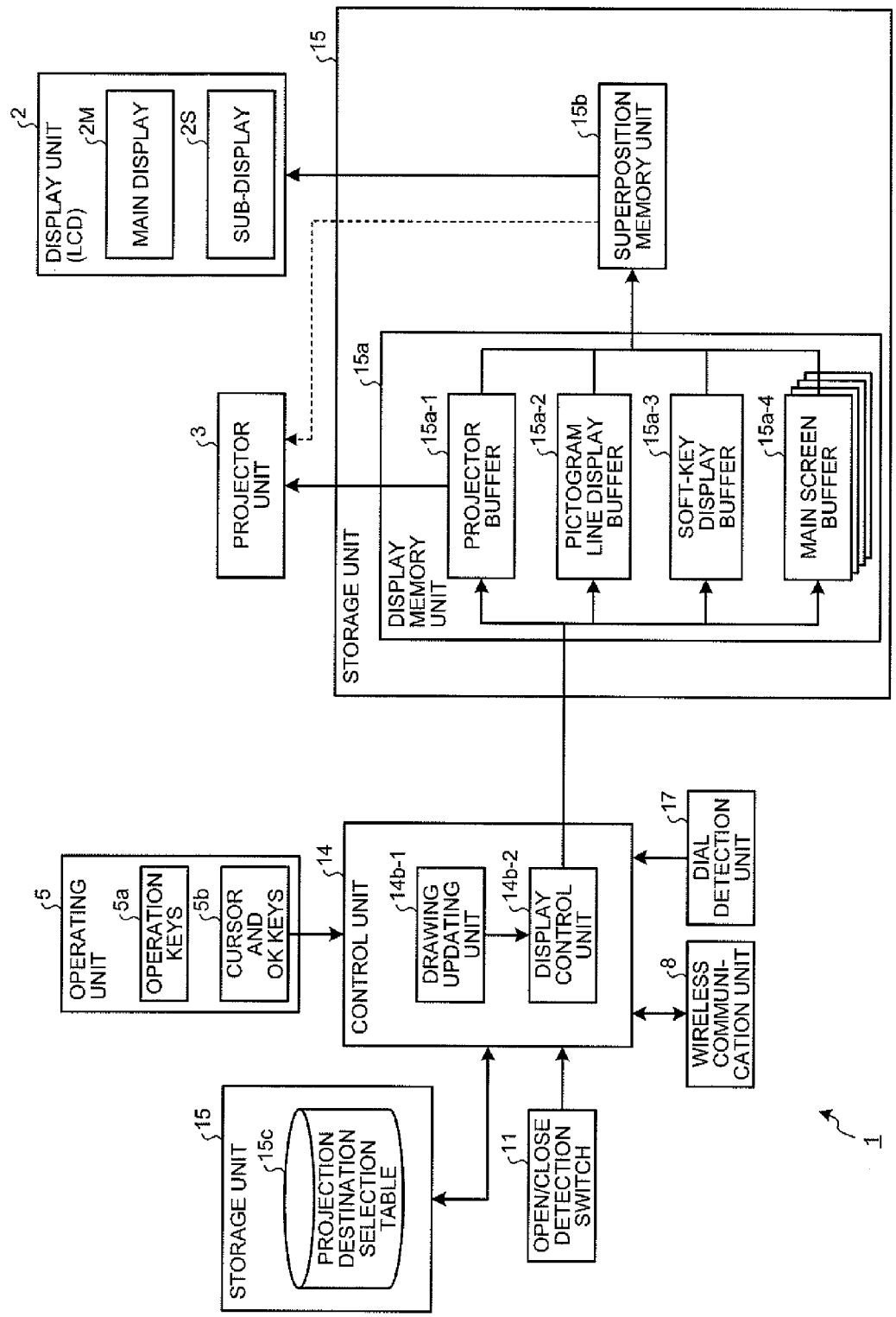
FIG. 5 is an exemplary block diagram for explaining the example of functions of the portable electronic apparatus centered on a control unit and a storage unit according to the embodiment.

With reference to FIGS. 4 and 5, the functions of the portable electronic apparatus 1 according to the present embodiment will be described hereinafter.

FIG. 4 is an exemplary block diagram illustrating an example of the functions of the portable electronic apparatus 1 divided into the first case 1CA and the second case 1CB according to the present embodiment. As depicted in FIG. 4, the portable electronic apparatus 1 includes the first case 1CA (an upper case) and the second case 1CB (a lower case).

In FIG. 4, explanations for the display unit 2, the projector unit 3, the camera 4, and the speaker 6 included in the first case 1CA are omitted because they are the same as those explained with reference to FIGS. 1 to 3 above. Similarly, explanations for the operating unit 5, the microphone 7, the power supply unit 10, the open/close detection switch 11, and the tilt detection unit 12 included in the second case 1CB are omitted because they are the same as those explained with reference to FIGS. 1 to 3 above.

As depicted in FIG. 4, the wireless communication unit 8 includes an antenna 8a and an antenna 8b. The antenna 8a here may be, for example, a wireless communication antenna that carries out long-distance and short-distance wireless communications used for telephone calls, data transmission and reception, and such. The antenna 8b may be, for example, a television broadcast receiving antenna such as a one-segment broadcast (television broadcast for mobile electronic apparatuses) receiving antenna. The wireless communication unit 8 further includes an antenna switch 8c that switches between the antenna 8a and the antenna 8b. The wireless communication unit 8 includes, for example, a CDMA RF module 8d that carries out a high-frequency processing for a CDMA terminal. The antennas 8a, 8b, the antenna switch 8c, and the CDMA RF module 8d as a whole constitute the wireless communication unit 8. The wireless communication unit 8 carries out wireless communications with base stations through the antennas 8a, 8b via a channel allocated by one of the base stations. The wireless communication unit 8 here may carry out the transmission and reception of a signal by combining a plurality of signals from a plurality of base stations using a communication method such as code division multiple access (CDMA) 2000_1x system.

In FIG. 4, the portable electronic apparatus 1 includes the main CPU 14a, a display controller 14b, and a voice processing unit 14c as the control unit 14. The main CPU 14a has a function to control each of the constituent units communicatively connected with the CPU 14a. The display controller 14b has a drawing function and a display control function to make the display unit 2 and the projector unit 3 display given display data stored in a storage unit 15. The voice processing unit 14c has a function to carry out the voice processing of converting a voice received through the microphone 7 to voice data and converting the voice data to a voice to be output through the speaker 6. The details of the display controller 14b that includes a drawing updating unit 14b-1 and a display control unit 14b-2 will be described later.

The voice processing unit 14c carries out the processes of a voice signal output from the speaker 6 and of a voice signal received from the microphone 7. More specifically, the voice processing unit 14c amplifies the voice received from the microphone 7, carries out analog-to-digital conversion (A/D conversion), and further performs a signal processing of encoding and such, thereby converting the voice to digital voice data to output to the main CPU 14a. Furthermore, the voice processing unit 14c performs the processes of decoding, digital-to-analog conversion (D/A conversion), amplification, and such to the voice data sent from the main CPU 14a so as to output to the speaker 6 after converting the voice data to an analog voice signal.

In FIG. 4, the portable electronic apparatus 1 includes, as the storage unit 15, V-RAMs 15a, 15b and a memory 15c. The V-RAMs 15a and 15b store various types of display data updated to draw by the display controller 14b, and the memory 15c corresponds to a later described projection destination selection table 15c in FIG. 5. The details of the V-RAMs 15a, 15b and the projection destination selection table 15c of the storage unit 15 will be described later.

In FIG. 4, the portable electronic apparatus 1 includes high-speed serial interfaces 16a and 16b that transmit and receive data sequentially at a high-speed in both the first case 1CA and the second case 1CB. The portable electronic apparatus 1 writes the display data updated to draw by the display controller 14b to the V-RAM 15a. The portable electronic apparatus 1 then sends the display data from the second case 1CB to the first case 1CA via the high-speed serial interface 16a. The portable electronic apparatus 1 receives the display data with the high-speed serial interface 16b of the first case 1CA and writes the display data to the V-RAM 15b. The portable electronic apparatus 1 then makes the display unit 2 and/or the projector unit 3 display the display data stored in the V-RAM 15b. In FIG. 4, while an example of the V-RAMs 15a and 15b being included in both the first case 1CA and the second case 1CB is exemplified, the portable electronic apparatus 1 may be configured with a single V-RAM included in either one of the first case 1CA or the second case 1CB as necessary.

FIG. 5 is an exemplary block diagram for explaining an example of functions of the portable electronic apparatus 1 centered on the control unit 14 and the storage unit 15 according to the present embodiment. As depicted in FIG. 5, the portable electronic apparatus 1 includes the display unit 2 including the main display 2M and the sub-display 2S that display given display data. The portable electronic apparatus 1 includes the projector unit 3 that projects at least a part of the given display data. The portable electronic apparatus 1 includes the operating unit 5 including the operation keys 5a and the cursor and OK keys 5b that are key-operated by the user. The portable electronic apparatus 1 includes the wireless communication unit 8 that carries out wireless communications. The portable electronic apparatus 1 includes the open/close detection switch 11 that detects a variation in the open/closed state of the portable electronic apparatus 1. The portable electronic apparatus 1 includes the control unit 14 including at least the drawing updating unit 14b-1 and the display control unit 14b-2 that correspond to the display controller 14b in FIG. 4. The portable electronic apparatus 1 includes the storage unit 15 including at least a display memory unit 15a, a superposition memory unit 15b, and the projection destination selection table 15c. The display memory unit 15a and the superposition memory unit 15b correspond to the V-RAMs 15a and 15b in FIG. 4. The projection destination selection table 15c corresponds to the memory 15c in FIG. 4. The portable electronic apparatus 1 further includes a dial detection unit 17 having functions such as detecting the telephone number of a calling party from a dialing signal when making calls.

The control unit 14 comprehensively controls the overall operation of the portable electronic apparatus 1. More specifically, the control unit 14 controls the operations of the display unit 2, the projector unit 3, the wireless communication unit 8, the dial detection unit 17, and the like to realize the various functions. By the control unit 14, the various processes of the portable electronic apparatus 1 are executed in appropriate procedures corresponding to the operation of the operating unit 5 and the software, data, and such stored in the storage unit 15 of the portable electronic apparatus 1. The various processes of the portable electronic apparatus 1 include, for example, voice calls made through a line switching network, creating e-mail and sending and receiving e-mail, browsing Internet web (world wide web) sites, and read and write controls of the storage unit 15. By the various processes, various functions such as a display data drawing function, the display control function, a voice call function, an external device communication function, a data communication function, a browser communication function, a data downloading function, a file sharing function, an address book read and write function, and a database read and write function are realized. The operations of the wireless communication unit 8, the display unit 2, the projector unit 3, and such include, for example, sending and receiving of signals in the wireless communication unit 8, and the display or the projection of display data on the display unit 2 and/or by the projector unit 3.

As depicted in FIG. 5, the control unit 14 is configured to include the drawing updating unit 14*b*-1 and the display control unit 14*b*-2.

The drawing updating unit 14*b*-1 is a drawing updating unit that has a function to draw display data. For example, the drawing updating unit 14*b*-1 carries out drawing processes such as a pictogram drawing process, a soft-key drawing process, an image drawing process, and a main screen drawing process. The drawing updating unit 14*b*-1 further makes a request of updating the screen on display and/or projection to the display unit 2 and/or the projector unit 3.

The display control unit 14*b*-2 is a display control unit that writes various types of display data in which the drawing process is carried out or an update is requested by the drawing updating unit 14*b*-1 to the display memory unit 15*a* and/or the superposition memory unit 15*b* to carry out the display control of the display unit 2 and/or the projector unit 3. For example, the display control unit 14*b*-2 writes the display data to be projected by the projector unit 3 to a projector buffer 15*a*-1. The display control unit 14*b*-2 then transfers the display data written to the projector buffer 15*a*-1 to the projector unit 3 to make the projector unit 3 project the display data. The display control unit 14*b*-2 writes the battery level display information and the wireless connectivity information to a pictogram line display buffer 15*a*-2. The display control unit 14*b*-2 writes soft-key display information to a soft-key display buffer 15*a*-3. The display control unit 14*b*-2 writes the display data to be displayed by the display unit 2 to a main screen buffer 15*a*-4.

The display control unit 14*b*-2 further writes at least a part of the display data written to the projector buffer 15*a*-1, the battery level display information and the wireless connectivity information written to the pictogram line display buffer 15*a*-2, the soft-key display information written to the soft-key display buffer 15*a*-3, and the display data written to the main screen buffer 15*a*-4 to the superposition memory unit 15*b*. The display control unit 14*b*-2 forms the display data combined with these various types of data written to the superposition memory unit 15*b*. The display control unit 14*b*-2 then transfers the combined display data written to the superposition memory unit 15*b* to the display unit 2 and/or the projector unit 3 so as to make the display unit 2 and/or the projector unit 3 display and/or project the display data. The display control unit 14*b*-2 may carry out the display control process described above after selecting a projection destination for each of the file types or the functions of the display data by referring to projection destination selection information stored in the projection destination selection table 15*c*.

In the present embodiment of the invention, the control unit 14 uses the drawing updating function by the drawing updating unit 14*b*-1 and the display control function by the display control unit 14*b*-2 being coupled with each other.

In other words, the control unit 14 makes the display unit 2 and/or the projector unit 3 display and/or project the display data stored in the storage unit 15. The control unit 14 may make the display unit 2 display the display data including the battery level display information and make the projector unit 3 project the display data without including the battery level display information. The control unit 14 may make the display unit 2 display the display data including the wireless connectivity information and make the projector unit 3 project the display data without including the wireless connectivity information. The control unit 14 may make the display unit 2 display the display data including the soft-key display information and make the projector unit 3 project the display data without including the soft-key display information.

The control unit 14 may make the projector unit 3 project the display data stored in a main-memory unit (the projector buffer 15*a*-1). The control unit 14 may make the projector unit 3 project the display data stored in the superposition memory unit 15*b*. The control unit 14 may make the projector unit 3 project the display data stored in either the main-memory unit (the projector buffer 15*a*-1) or the superposition memory unit 15*b* selected by the user (the projector buffer 15*a*-1 or the superposition memory unit 15*b*). While the display data is being projected by the projector unit 3, the control unit 14 updates the display data projected by the projector unit 3 when the display data stored in the main-memory unit (the projector buffer 15*a*-1) is updated. The control unit 14 may not need to update the display data projected by the projector unit 3 even if the battery level display information and/or the wireless connectivity information stored in a sub-memory unit (the pictogram line display buffer 15*a*-2) is updated without the display data stored in the main-memory unit (the projector buffer 15*a*-1) being updated.

While the display data is being projected by the projector unit 3, the control unit 14 may not need to change the display data projected by the projector unit 3 even if the wireless connectivity of the communication unit 8 is changed into within or out of service range and the wireless connectivity information stored in the sub-memory unit (corresponding to the pictogram line display buffer 15*a*-2) is updated. The control unit 14 changes the soft-key display information stored in the sub-memory unit (the soft-key display buffer 15*a*-3) when a variation in the open/closed state is detected by the open/close detection switch 11. Even if the variation in the open/closed state is detected by the open/close detection switch 11 and the soft-key display information stored in the sub-memory unit (the soft-key display buffer 15*a*-3) is updated while the display data is being projected by the projector unit 3, the control unit 14 may not need to change the display data projected by the projector unit 3. When the remaining amount of power of the power supply unit 10 fluctuates and the battery level display information stored in the sub-memory unit (the pictogram line display buffer 15*a*-2) is updated while the display data is being projected by the projector unit 3, the control unit 14 may make the projector unit 3 project the display data including the updated battery level display information.

The control unit 14 may display the display data on the projection destination set in the projection destination selection information stored in the projection destination selection table 15c. The resolution of the display unit 2 and the resolution of the projector unit 3 here are different from each other. The display unit 2 has a wide area including a larger number of pixels at least in one direction than the projector unit 3 (for example, in a situation where the display unit 2 is a wide VGA while the projector unit 3 is a normal VGA). The control unit 14 may display at least one of the battery level display information, the wireless connectivity information, and the soft-key display information on at least a part of the wide area of the display unit 2. The video graphics array (VGA) has a resolution of 640×480 dots and the wide video graphics array (wide VGA) has a resolution of 800×480 dots.

As an example, when using a wide VGA for the display unit 2 and using a normal VGA for the projector unit 3, because the wide VGA has 800×480 dots and the VGA has 640×480 dots, there is a difference area in which the difference in the number of pixels arises between the wide VGA of the display unit 2 and the VGA of the projector unit 3. Therefore, on the difference area of at least a part of the wide area of the display unit 2, the control unit 14 may display at least one of the battery level display information, the wireless connectivity information, and the soft-key display information. The control unit 14 may display at least one of the battery level display information, the wireless connectivity information, and the soft-key display information on the difference area in which the difference in the number of pixels arises between an extended graphics array (XGA) of 1024×768 dots and an ultra extended graphics array (UXGA) of 1600×1200 dots. The control unit 14 may display at least one of the battery level display information, the wireless connectivity information, and the soft-key display information on the difference area in which the difference in the number of pixels arises between a quarter video graphics array (QVGA) of 320×240 dots and a wide quarter video graphics array (wide QVGA) of 400×240 dots.

The storage unit 15 is configured with, for example, a non-volatile storage device (a non-volatile semiconductor memory such as a read only memory (ROM), a hard disk device, and the like) and a rewritable storage device (for example, a static random access memory (SRAM), a dynamic random access memory (DRAM), and a video random access memory (V-RAM)). The storage unit 15 stores various types of files, tables, programs, databases, and such (for example, the display memory unit 15a, the superposition memory unit 15b, and the projection destination selection table 15c). The display memory unit 15a further includes the projector buffer 15a-1, the pictogram line display buffer 15a-2, the soft-key display buffer 15a-3, and the main screen buffer 15a-4.

In the present embodiment of the invention, the storage unit 15 is a storage unit that stores given display data including at least self-state information indicative of the state of the own apparatus. The self-state information here may include the battery level display information indicative of the remaining amount of power of the power supply unit 10. The self-state information here may further include the wireless connectivity information indicative of the wireless connectivity of the wireless communication unit 8. The self-state information may further include the soft-key display information indicative of the operation available in the operating unit 5.

Out of the elements of the storage unit 15, the display memory unit 15a is a display memory for forming the display data to be displayed and/or projected on the display unit 2 and/or by the projector unit 3. The display memory 15a here may further include the sub-memory unit (the pictogram line display buffer 15a-2 and the soft-key display buffer 15a-3) for updating as needed at least one of the battery level display information, the wireless connectivity information, and the soft-key display information indicative of the terminal status to be displayed on the display unit 2, and the main-memory unit (the projector buffer 15a-1 and the main screen buffer 15a-4) for updating to draw the display data other than the battery level display information, the wireless connectivity information, and the soft-key display information stored in the sub-memory unit. More specifically, the display memory unit 15a includes at least the projector buffer 15a-1 that stores the display data to be projected by the projector unit 3, the soft-key display buffer 15a-3 that stores the soft-key display information, the pictogram line display buffer 15a-2 that stores the battery level display information and the wireless connectivity information, and the main screen buffer 15a-4 that stores the display data to be displayed on the display unit 2.

The superposition memory unit 15b is a superposing memory for forming the combined display data by superposing at least a part of the display data stored in the display memory unit 15a to be displayed on the display unit 2 and/or by the projector unit 3. More specifically, the superposition memory unit 15b may store the display data superposed with at least a part of the display data stored in the projector buffer 15a-1, the soft-key display information stored in the soft-key display buffer 15a-3, the battery level display information and the wireless connectivity information stored in the pictogram line display buffer 15a-2, and the display data stored in the main screen buffer 15a-4.

The projection destination selection table 15c is a projection destination selection information storage unit that stores therein the projection destination selection information in which the projection destination of the display data is set to either the display unit 2 or the projector unit 3, or to both the display unit 2 and the projector unit 3.

With reference to FIG. 6, an example of the projection destination selection table 15c will be explained. As depicted in FIG. 6, the projection destination selection table 15c stores therein the information used when selecting the projection destination for each of the files and functions to be displayed. For example, on the second line of the projection destination selection table 15c, when the file is a power point (registered trademark) file, the pictogram line display information to be displayed in the pictogram area (status information area) is set to be displayed on the display unit 2 of an LCD. Similarly, the soft-key display information that is displayed in a soft-key area is set to be displayed on the display unit 2 of the LCD. Similarly, the sub-menus are set to be displayed and/or projected both on the display unit 2 and by the projector unit 3, a slide portion for a main 1 by the projector unit 3, and a note portion for a main 2 on the display unit 2 of LCD. On the third line of the projection destination selection table 15c, when the file is a PDF (registered trademark) file, the pictogram area, the soft-key area, and the sub-menus are set as the same as those for the power point (registered trademark) file on the second line. The main body for the main 1 is set to be projected by the projector unit 3 and a page view for the main 2 is set to be displayed on the display unit 2 of LCD.

In FIG. 6, on the fourth line of the projection destination selection table 15c, when using a standby function (in other words, when displaying a wallpaper), the pictogram area is set to be projected by the projector unit 3 and the soft-key area and the sub-menus are set to be displayed on the display unit 2 of the LCD. The background (wallpaper) for the main 1 is set to be displayed on the display unit 2 of the LCD and an announcement display for the main 2 is set to be projected by the projector unit 3. On the fifth line of the projection destination selection table 15c, when using an e-mail function, the pictogram area and the soft-key area are set to be displayed on the display unit 2 of the LCD. The sub-menus are set to be displayed and/or projected both on the display unit 2 and by the projector unit 3. The subjects for the main 1 are set to be displayed on the display unit 2 of the LCD and the main body for the main 2 is set to be projected by the projector unit 3. On the sixth line of the projection destination selection table 15*c*, when using a browser function, the pictogram area, the soft-key area, and the sub-menus are set to be the same as those of the e-mail function on the fifth line. The main 1 is set to be projected by the projector unit 3. On the seventh line of the projection destination selection table 15*c*, the pictogram area that displays time is set to be projected by the projector unit 3, and the soft-key area and the sub-menus are set to be displayed on the display unit 2 of the LCD. As for the main 1, a television screen is set to be projected by the projector unit 3.

As described in the foregoing, the storage unit 15 has the projector buffer 15*a*-1 in the display memory unit 15*a*, and the control unit 14 writes the display data to be projected by the projector unit 3 to the projector buffer 15*a*-1. The display data that the control unit 14 transfers to the projector unit 3 here is selectable to use from either the superposition memory unit 15*b* or the projector buffer 15*a*-1. The control unit 14 writes certain display data (moving images/still images) consistently to the projector buffer 15*a*-1. The control unit 14 transfers the display data to the projector unit 3 only when a change is made in the projector buffer 15*a*-1 (for example, the data is not transferred to the projector unit 3 even if the pictogram line display buffer 15*a*-2 is updated).

Furthermore, when the projector function is available for use, the control unit 14 makes each of the files or functions ready to be set to either the display unit 2 or the projector unit 3, or to the both. This allows the control unit 14 to carry out a most suitable display by displaying and/or projecting in accordance with the setting.

An example of the process of the portable electronic apparatus 1 according to the present embodiment will be explained in detail with reference to FIGS. 7 to 13.

Figure 7:
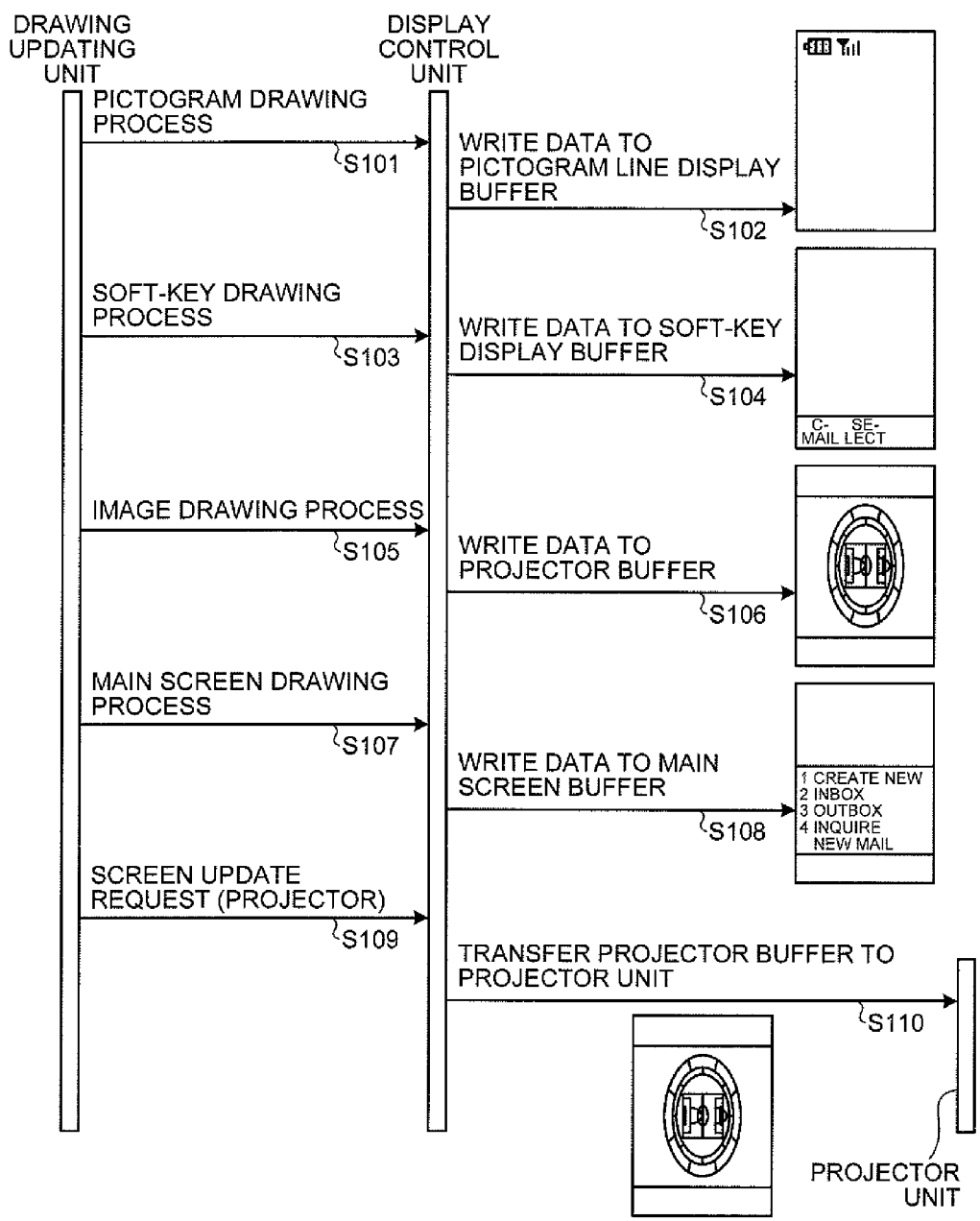
FIG. 7 is an exemplary sequence diagram illustrating an example of the process of projecting the display data in a projector buffer by a projector unit according to the embodiment.
Figure 8:
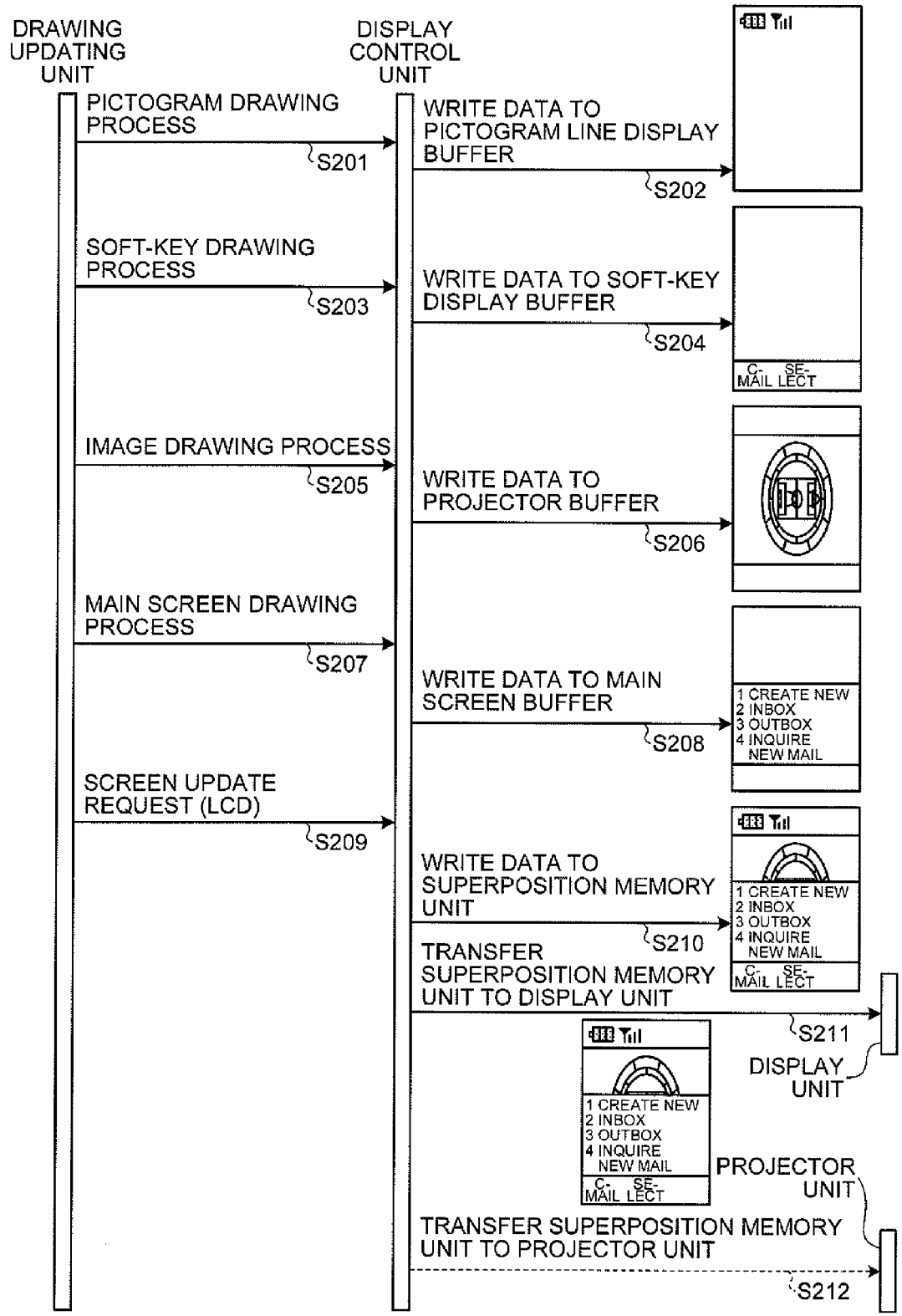
FIG. 8 is an exemplary sequence diagram illustrating an example of the process of displaying the display data from a superposition memory unit on a display unit according to the embodiment.
Figure 9:
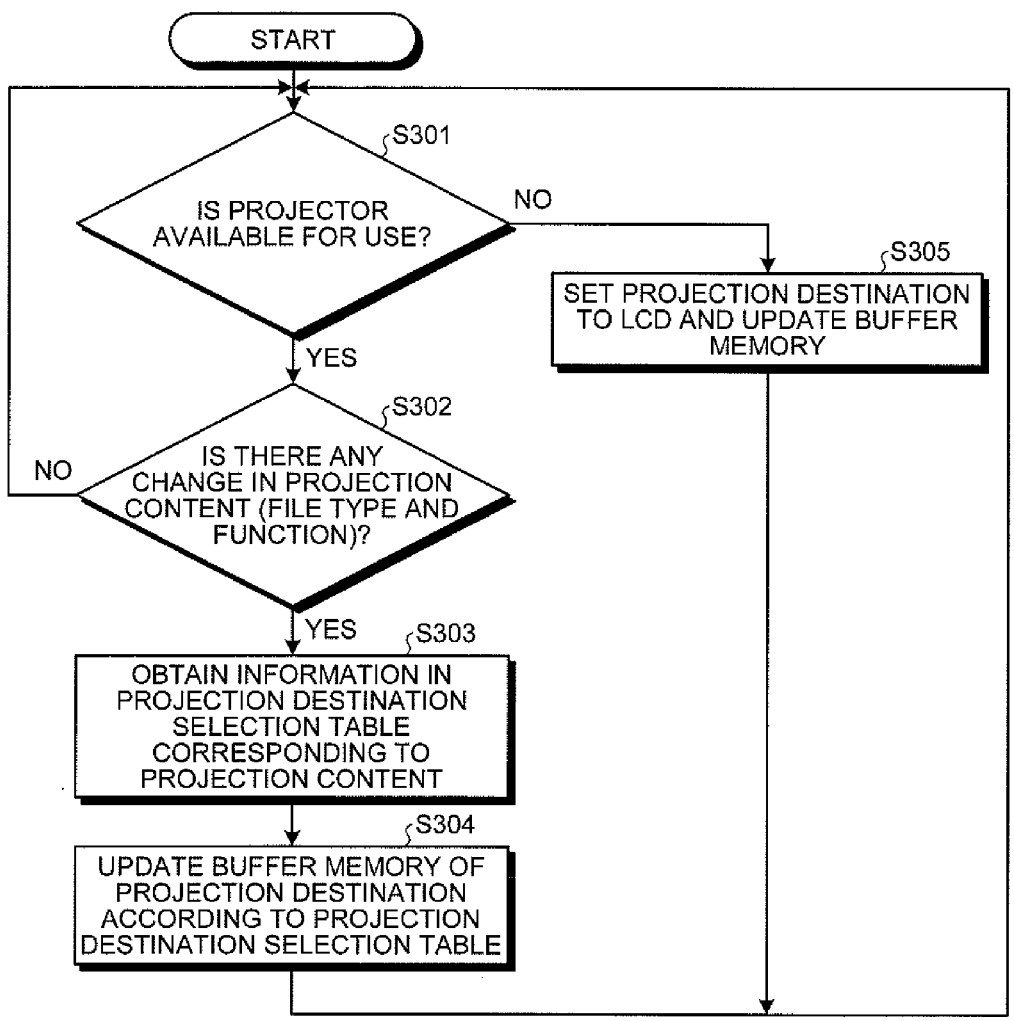
FIG. 9 is an exemplary flowchart illustrating an example of a projection destination selection control according to the embodiment.
Figure 10:
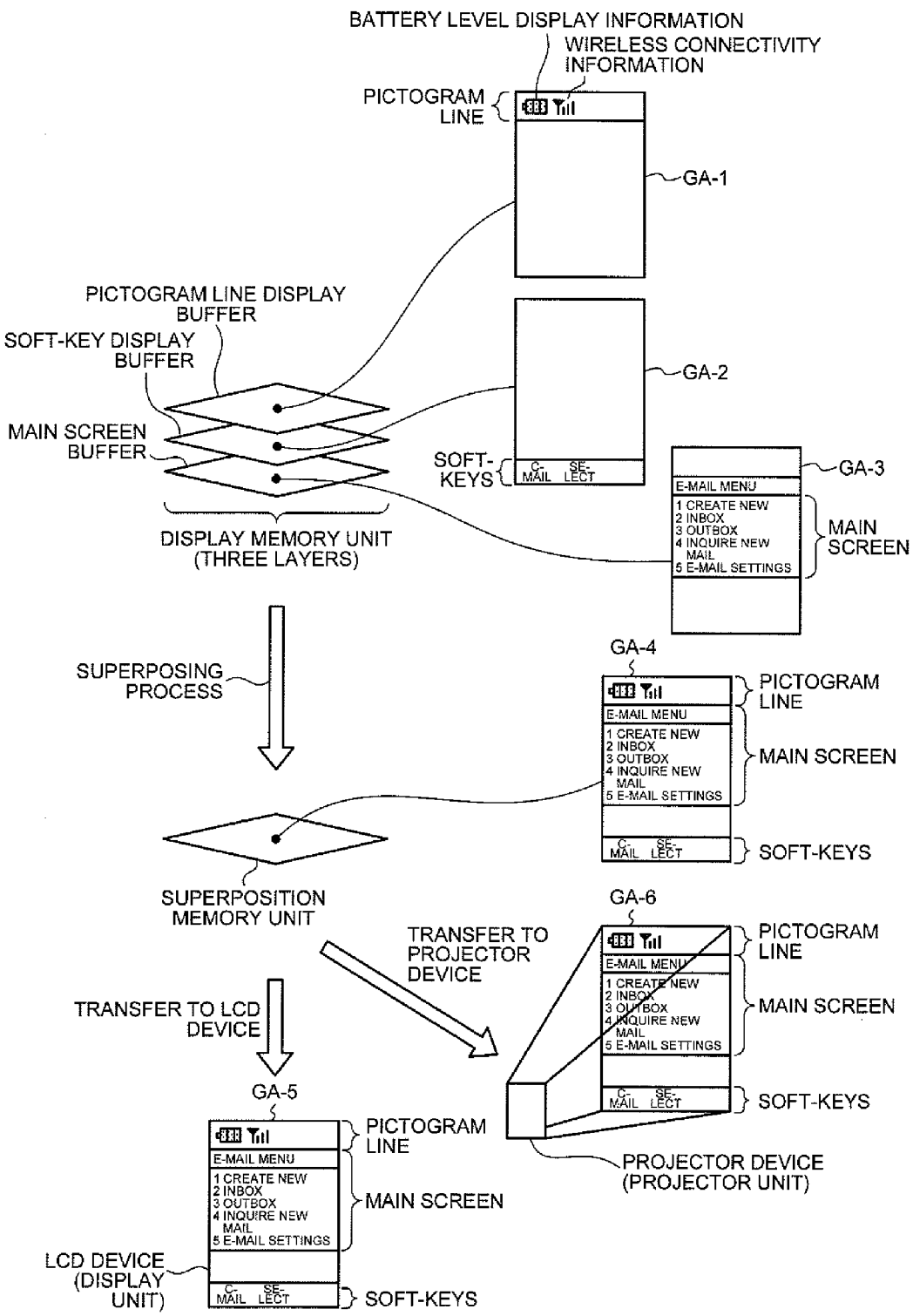
FIG. 10 is an exemplary diagram illustrating an example of a virtual display control.
Figure 12:
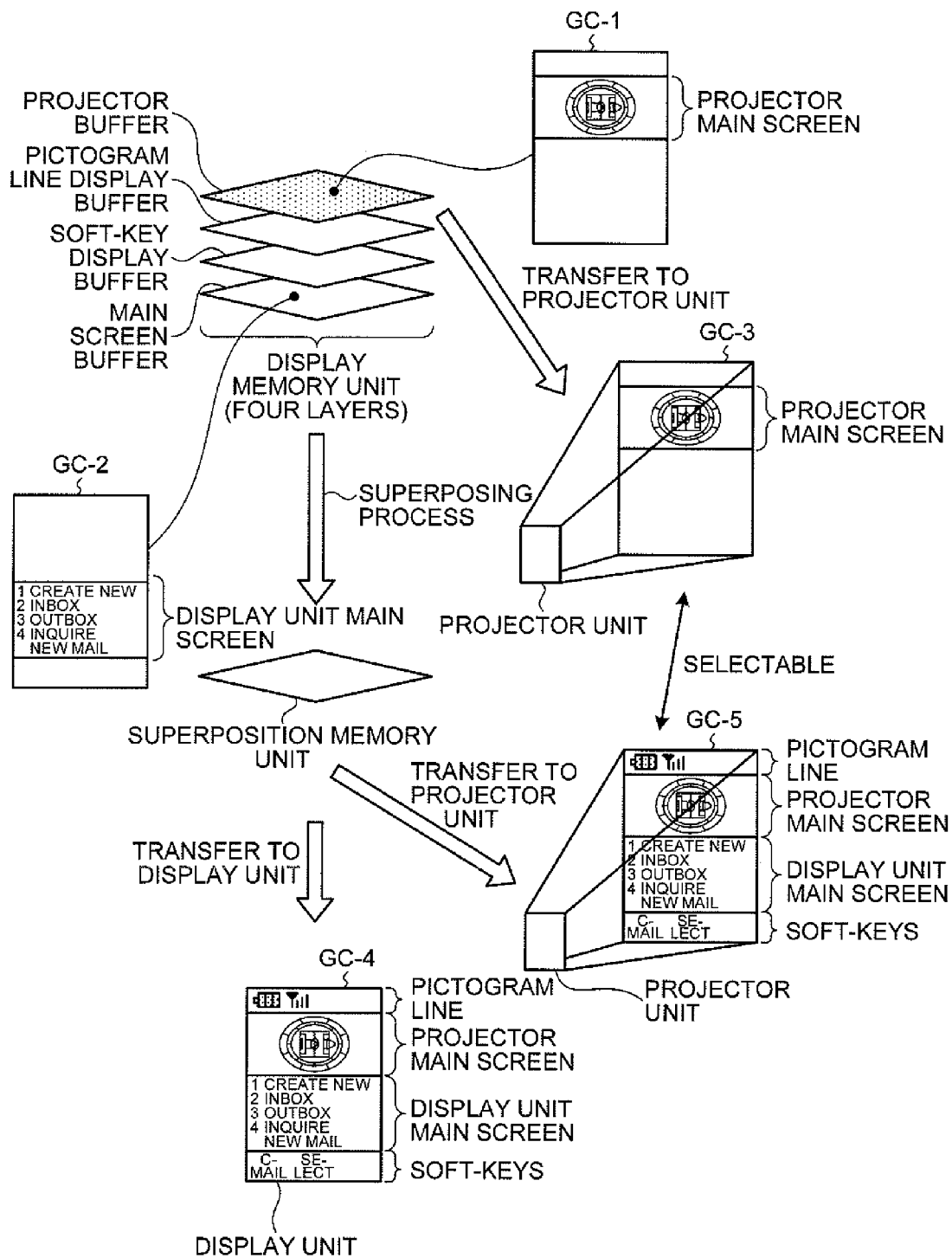
FIG. 12 is an exemplary diagram illustrating an example of a display control according to the embodiment of the invention.
Figure 13:
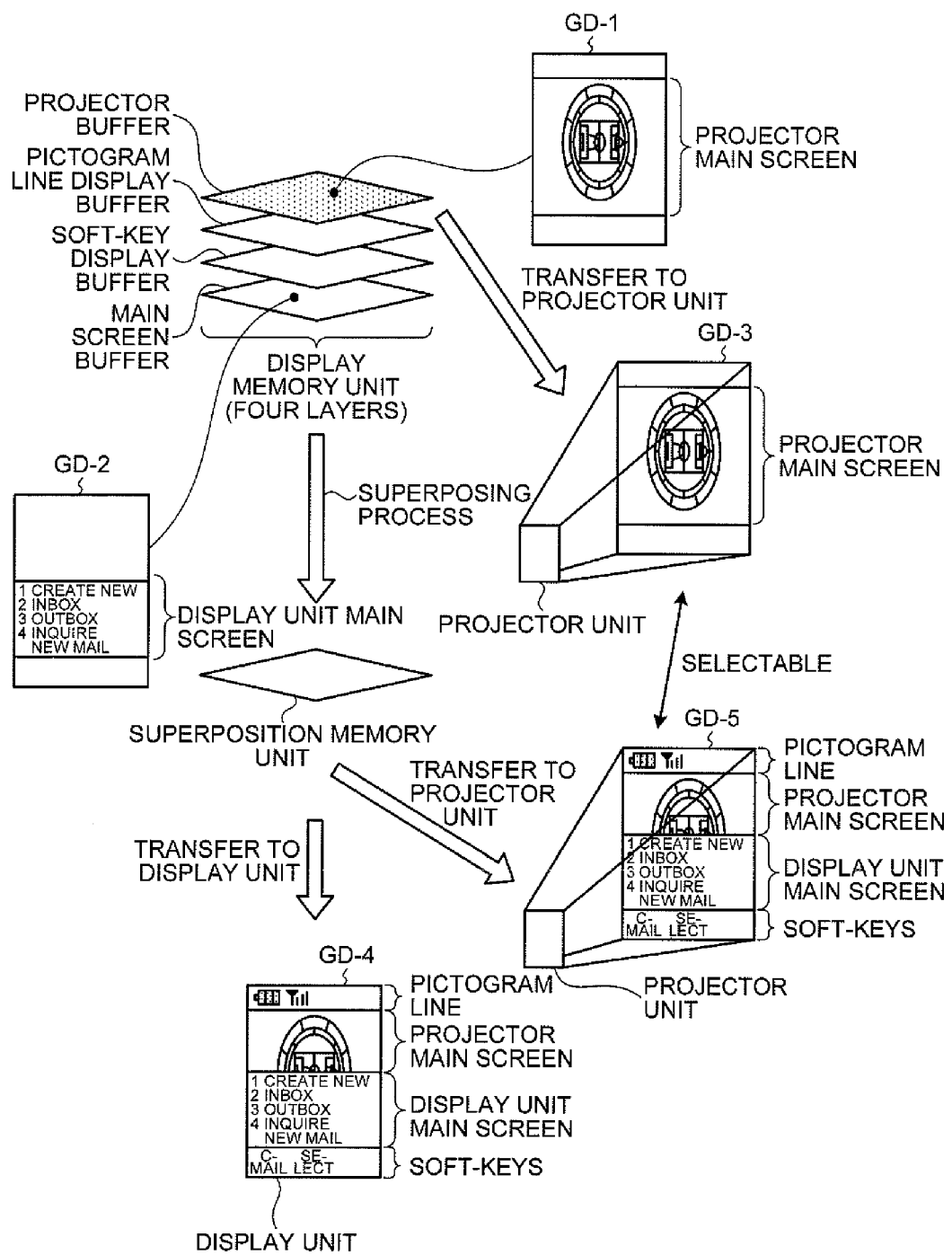
FIG. 13 is an exemplary diagram illustrating another example of the display control according to the embodiment of the invention.

FIG. 7 is an exemplary sequence diagram illustrating an example of the process of projecting the display data in the projector buffer 15*a*-1 by the projector unit 3 according to the present embodiment. FIG. 8 is an exemplary sequence diagram illustrating an example of the process of displaying the display data from the superposition memory unit on the display unit 2 according to the present embodiment. FIG. 9 is an exemplary flowchart illustrating an example of a projection destination selection control according to the present embodiment. FIG. 10 is an exemplary diagram illustrating an example of a virtual display control. FIG. 11 is an exemplary diagram illustrating an example of a virtual display screen. FIG. 12 is an exemplary diagram illustrating an example of the display control according to the embodiment of the invention. FIG. 13 is an exemplary diagram illustrating another example of the display control according to the embodiment of the invention.

As depicted in FIG. 7, when projecting the display data in the projector buffer 15*a*-1 by the projector unit 3, the drawing updating unit 14*b*-1 carries out a pictogram drawing process in which the battery level display information indicative of the remaining amount of power in the power supply unit 10 that supplies power and the wireless connectivity information indicative of the wireless connectivity of the communication unit 8 that carries out wireless communications are drawn (S101).

The display control unit 14*b*-2 writes the battery level display information (for example, a battery icon) and the wireless connectivity information (for example, an antenna icon) drawing-processed by the process of the drawing updating unit 14*b*-1 at S101 to the pictogram line display buffer 15*a*-2 (S102).

The drawing updating unit 14*b*-1 carries out a soft-key drawing process in which the soft-key display information indicative of the operation available in the operating unit 5 is drawn (S103).

The display control unit 14*b*-2 writes the soft-key display information (for example, C-MAIL or SELECT) drawing-processed by the process of the drawing updating unit 14*b*-1 at S103 to the soft-key display buffer 15*a*-3 (S104).

The drawing updating unit 14*b*-1 carries out an image drawing process of the display data to be projected by the projector unit 3 (S105).

The display control unit 14*b*-2 writes the display data (for example, an image of a football ground) drawing-processed by the process of the drawing updating unit 14*b*-1 at S105 to the projector buffer 15*a*-1 (S106).

The drawing updating unit 14*b*-1 carries out a main screen image drawing process of the display data to be displayed on the display unit 2 (S107).

The display control unit 14*b*-2 writes the display data (for example, an E-mail menu display) drawing-processed by the process of the drawing updating unit 14*b*-1 at S106 to the main screen buffer 15*a*-4 (S108).

When a screen update request is made to the projector unit 3 by the process of the drawing updating unit 14*b*-1 (S109), the display control unit 14*b*-2 transfers the display data written to the projector buffer 15*a*-1 at S106 to the projector unit 3 (S110). Consequently, the display control unit 14*b*-2 makes the projector unit 3 project the display data. More specifically, the display control unit 14*b*-2 makes the projector unit 3 project the display data stored in the main-memory unit (the projector buffer 15*a*-1).

The display control unit 14*b*-2 may make the display unit 2 display the display data including the battery level display information and make the projector unit 3 project the display data without including the battery level display information. The display control unit 14*b*-2 may make the display unit 2 display the display data including the wireless connectivity information and make the projector unit 3 project the display data without including the wireless connectivity information. The display control unit 14*b*-2 may make the display unit 2 display the display data including the soft-key display information and make the projector unit 3 project the display data without including the soft-key display information.

While the display data is being projected by the projector unit 3, when the display data stored in the main-memory unit (the projector buffer 15*a*-1) is updated, the display control unit 14*b*-2 updates the display data projected by the projector unit 3. The display control unit 14*b*-2 may not need to update the display data projected by the projector unit 3 even if the battery level display information and/or the wireless connectivity information stored in the sub-memory unit (the pictogram line display buffer 15*a*-2) is updated without the display data stored in the main-memory unit (the projector buffer 15*a*-1) being updated. While the display data is being projected by the projector unit 3, the display control unit 14*b*-2 may not need to change the display data projected by the projector unit 3 even if the wireless connectivity information stored in the sub-memory unit (corresponds to the pictogram line display buffer 15*a*-2) is updated by the change in the wireless connectivity of the wireless communication unit 8 into within or out of service range. When a variation in the open/closed state is detected by the open/close detection switch 11, the display control unit 14*b*-2 changes the soft-key display information stored in the sub-memory unit (the soft-key display buffer 15a-3). While the display data is being projected by the projector unit 3, the display control unit 14b-2 may not need to change the display data projected by the projector unit 3 even if a variation in the open/closed state is detected by the open/close detection switch 11 and the soft-key display information stored in the sub-memory unit (the soft-key display buffer 15a-3) is changed. While the display data is being projected by the projector unit 3, when the remaining amount of power of the power supply unit 10 fluctuates and the battery level display information stored in the sub-memory unit (the pictogram line display buffer 15a-2) is updated, the display control unit 14b-2 may make the projector unit 3 project the display data including the updated battery level display information.

The display control unit 14b-2 may display the display data on the projection destination set in the projection destination selection information stored in the projection destination selection table 15c.

With reference to FIG. 8, making the display unit 2 display the display data from the superposition memory unit 15b will be explained.

In FIG. 8, because the processes at S201 to S208 are the same as those at S101 to S108 in FIG. 7, respectively, their explanations are omitted.

As illustrated in FIG. 8, when the screen updating request is made to the display unit 2 of the LCD by the process of the drawing updating unit 14b-1 (S209), the display control unit 14b-2 writes at least a part of the display data written to the respective buffers at S202, S204, S206, and S208 to the superposition memory unit 15b (S210). Accordingly, the display control unit 14b-2 forms the display data with these various types of data combined. The display control unit 14b-2 then transfers the combined display data written to the superposition memory unit 15b to the display unit 2 (S211). Consequently, the display control unit 14b-2 makes the display unit 2 display the combined display data. The display control unit 14b-2 may transfer the combined display data written to the superposition memory unit 15b to the projector unit 3 (S212). Accordingly, the display control unit 14b-2 may make the projector unit 3 project the combined display data.

The display control unit 14b-2 may make the projector unit 3 project the display data stored in the superposition memory unit 15b. Furthermore, the display control unit 14b-2 may make the projector unit 3 project the display data stored in either the main-memory unit (the projector buffer 15a-1) or the superposition memory unit 15b (the projector buffer 15a-1 or the superposition memory unit 15b) selected by the user.

The resolution of the display unit 2 and the resolution of the projector unit 3 may be different. For example, the display unit 2 may have a wide area including a larger number of pixels at least in one direction than the projector unit 3. An example of including a wide area includes, for example, a situation where the display unit 2 is a wide VGA and the projector 3 is a normal VGA. The display control unit 14b-2 may display at least one of the battery level display information, the wireless connectivity information, and the soft-key display information on at least a part of the wide area of the display unit 2. The video graphics array (VGA) has a resolution of 640×480 dots and the wide video graphics array (wide VGA) has a resolution of 800×480 dots.

As an example, when a wide VGA is used for the display unit 2 and a normal VGA is used for the projector unit 3, because the wide VGA has 800×480 dots and the VGA has 640×480 dots, there is a difference area where the difference in the number of pixels arises between the wide VGA of the display unit 2 and the VGA of the projector unit 3. Accordingly, the control unit 14 may display at least one of the battery level display information, the wireless connectivity information, and the soft-key display information on at least a part of the difference area in the wide area of the display unit 2. The control unit 14 may display at least one of the battery level display information, the wireless connectivity information, and the soft-key display information on the difference area where the difference in the number of pixels arises between an XGA of 1024×768 dots and a UXGA of 1600×1200 dots. The control unit 14 may display at least one of the battery level display information, the wireless connectivity information, and the soft-key display information on the difference area where the difference in the number of pixels arises between a QVGA of 320×240 dots and a wide QVGA of 400×240 dots.

The display control unit 14b-2 may display the display data on the projection destination (the display unit 2 and/or the projector unit 3) set in the projection destination selection information stored in the projection destination selection table 15c.

With reference to FIG. 9, an example of the projection destination selection control according to the present embodiment will be explained.

As illustrated in FIG. 9, the display control unit 14b-2 determines if the projector unit 3 is available for use (S301).

When the projector unit 3 is available for use (Yes at S301), the display control unit 14b-2 determines if there is any change in projection content (for example, the type of file and the function) by referring to the data stored in the display memory unit 15a (S302).

When there is a change in the projection content (Yes at S302), the display control unit 14b-2 obtains, corresponding to the projection content (for example, a television function), the projection destination selection information (for example, the main 1 that displays a television screen is projected by the projector unit 3) in the projection destination selection table 15c (S303).

The display control unit 14b-2 updates the data in the respective buffers (for example, the projection buffer 15a-1) of the projection destination (for example, the projector unit 3) determined according to the projection destination selection information in the projection destination selection table 15c (S304). Thereafter, the display control unit 14b-2 repeats the procedure from the process at S301.

Returning to S302, when there is no change in the projection content (No at S302), the display control unit 14b-2 repeats the procedure from the process at S301.

Returning back to S301, when the projector unit 3 is not available for use (No at S301), the display control unit 14b-2 sets the projection destination to the display unit 2 of the LCD, and updates the data stored in the display memory unit 15a and the superposition memory unit 15b (S305). Thereafter, the display control unit 14b-2 repeats the procedure from the process at S301.

In a portable terminal illustrated in FIG. 10, for the purpose of efficient processing, the terminal has a display memory unit in a three-layer structure including a pictogram line display buffer (GA-1), a soft-key display buffer (GA-2), and a main screen buffer (GA-3) that store various types of display data to be displayed on an LCD. The display memory may further have a background buffer, a pop-up buffer, and the like in addition. When displaying on an LCD device (a display unit), a superposing process is carried out to combine the data in the above three buffers (the pictogram line display buffer, the main screen display buffer, and the soft-key display buffer) in the superposition memory unit 15b (GA-4). The combined data is then transferred to the LCD device to be displayed (GA-5). Furthermore, by setting a projector device (a projector unit) as a transfer destination device, it can be used as a projector function (GA-6).

However, if the combined data is transferred to the projector unit similarly to the LCD device, as illustrated in FIG. 11, there is a possibility of even displaying information unnecessary when the projector function is used. More specifically, in FIG. 11, in displaying a still image (GB-1), while it is desirable that only a main image 1 is projected by the projector as a user need, there is a possibility of even a pictogram line display and a soft-key display being included. Furthermore, in FIG. 11, in a two-screen television display (GB-2), while only the main image 1 is necessary, there is a possibility of even the pictogram line display, an E-mail menu display in a main image 2, and the soft-key display being included.

In contrast, the examples illustrated in FIGS. 12 and 13 are preferable.

In the exemplary embodiments illustrated in FIGS. 12 and 13, the display memory unit 15a of the storage unit 15 has not a three-layer-structure as the example depicted in FIG. 10 but a four-layer structure by being added the projector buffer 15a-1. In the projector buffer 15a-1, the display data of an image of a football ground is stored as an example of the projector main screen (GC-1, GD-1). The portable electronic apparatus 1 of the present embodiment transfers the display data stored in the projector buffer 15a-1 to the projector unit 3 directly to make the projector unit 3 project the display data of the image of the football ground as the projector main screen (GC-3, GD-3).

In the pictogram line display buffer 15a-2, a battery icon as an example of battery level display information, an antenna icon as an example of the wireless connectivity information, and the like are stored. In the soft-key display buffer 15a-3, a C-mail button display, a select button display, and the like as examples of the soft-key display information are stored. In the main screen buffer 15a-4, an E-mail menu display and such as an example of a display unit main screen are stored (GC-2, GD-2).

The control unit 14 of the portable electronic apparatus 1 carries out the superposing process where at least a part of the various types of data stored in the display memory unit 15a is superposed to combine the pictogram line, the projector main screen, the display unit main screen, and the soft-keys, and stores the combined data in the superposition memory unit 15b. The portable electronic apparatus 1 of the present embodiment transfers the combined display data stored in the superposition memory unit 15b to the display unit 2 and/or the projector unit 3 according to the projection destination selection information in the projection destination selection table 15c to make the display unit 2 display the display data (GC-4, GD-4) and/or to make the projector unit 3 project the display data (GC-5, GD-5).

While the example of the display control illustrated in FIG. 12 and the other example of the display control illustrated in FIG. 13 differ in the following points, they are basically the same. In the example of the display control illustrated in FIG. 12, when carrying out the superposing process, the image of the football ground to be displayed on the projector main screen is displayed small in the upper area so as not to overlap the E-mail menu display displayed on the display unit main screen. Meanwhile, in the other example of the display control illustrated in FIG. 13, when projecting by the projector unit 3, the image of the football ground to be displayed on the projector main screen is displayed large so as to fit a large screen.

Accordingly, in the portable electronic apparatus 1 of the present embodiment, for example, when projecting the display data by the projector unit 3, the display on the LCD and the projection display by the projector of the portable electronic apparatus 1 can be made different so that the unnecessary information (for example, the antenna icon and the battery icon displayed on the pictogram line) is not projected by the projector unit 3. Furthermore, the portable electronic apparatus 1 of the present embodiment can select the projection destination for each of the files and the functions to be displayed. Consequently, the portable electronic apparatus 1 of the present embodiment allows the projector unit 3 to display only the information that one wishes to view without making unnecessary displays, thereby making the screen much more eye-friendly for viewers than the display mixed with unnecessary information.

While the exemplary embodiments of the invention have been explained in the foregoing, the present invention can be implemented in various different embodiments, other than the above described embodiments, within the scope and spirit of the technical ideas described in the appended claims.

In each of the processes described in the embodiments, the whole or a part of the process described to be carried out automatically can be carried out manually, or the whole or a part of the process described to be carried out manually can be carried out automatically by a known method.

In addition, the processing procedure, the control procedure, the specific names, the information including registration data for each process and parameters of search condition and such, the exemplary screens, and the database structure indicated in the above literatures and the drawings can be changed arbitrarily, unless otherwise noted specifically.

As for the portable electronic apparatus 1, each of the constituent elements illustrated in the drawings is functionally conceptual and is not necessary to be physically structured as illustrated. For example, for the processing function included in each unit of the portable electronic apparatus 1, particularly each of the processing functions carried out by the control unit 14, the whole or any part thereof may be realized by a CPU and a program interpretively executed by the CPU, or by a wired logic as hardware. The program is recorded on a recording medium and is read out mechanically by the portable electronic apparatus 1 as necessary. More specifically, in the storage unit 15 such as a ROM or an HD, a computer program that gives a command to the CPU in cooperation therewith as an OS to execute various processes is recorded. The computer program is executed by being loaded into a RAM, thereby constituting the control unit 14 in cooperation with the CPU.

The computer program may be stored in an application program server connected to the portable electronic apparatus 1 via any network (for example, a mobile telephone network), and it is possible to download the whole or a part thereof as necessary. The program can be stored in a computer readable recording medium. The recording medium here includes any portable physical medium such as a memory card, a USB memory, an SD card, a flexible disk, a magneto-optical disk, a ROM, an EPROM, an EEPROM, a CD-ROM, an MO, a DVD, and a Blu-ray disc.

The program is a data processing method described in any language and in any description method regardless of its format such as source code and binary code. The program is not necessarily limited to that of a single structure, and includes that of a distributed configuration as a plurality of units and libraries and that achieves the functions in cooperation with a discrete program typically represented by an OS. In particular, the logical composition of the above OS program and base software can be changed arbitrarily and, for example, the OS program and the base software may be integrated to configure an OS program in a broad sense. As for a specific structure for reading the recording medium, a reading procedure, or an installation procedure after reading in each of the units exemplified in the embodiments, a known structure and procedure can be used.

Furthermore, specific embodiments of the distribution and/or integration of the apparatus are not limited to those illustrated in the drawings, and the whole or a part thereof can be configured by functionally or physically distributing and/or integrating in any unit according to various types of additions and such or according to functional loads. In other words, the above embodiments may be implemented in any combination thereof or the embodiments may be selectively implemented.

Industrial Applicability

As described in the foregoing, the portable electronic apparatus and the display control method according to the invention is useful because the display control can be carried out with the projector unit and the display unit in further consideration of the user needs.

The invention claimed is:

1. A portable electronic apparatus comprising:
a display unit that displays given display data;
a projector unit that projects at least a part of the display data;
a storage unit that stores therein the display data including at least self-state information indicative of a state of the portable electronic apparatus; and
a control unit that makes the display unit display the display data stored in the storage unit including the self-state information and makes the projector unit project the display data stored in the storage unit without including the self-state information, wherein
the display unit includes a first area for displaying a first image corresponding to a second image to be projected by the projector unit and a second area for displaying the self-state information,
the control unit makes the display unit display the first image and the self-state information in the first area and the second area, respectively,
the storage unit includes a display memory unit that forms the display data to be displayed and/or projected on the display unit and/or by the projector unit,
the display memory unit includes a sub-memory unit that updates the self-state information as needed and a main-memory unit that updates the display data other than the self-state information stored in the sub-memory unit, and
the control unit makes the projector unit project the display data stored in the main-memory unit.

2. The portable electronic apparatus according to claim 1, further comprising
a power supply unit that supplies power, wherein
the self-state information includes battery level display information indicative of a remaining amount of the power of the power supply unit, and
the control unit makes the display unit display the display data including the battery level display information and makes the projector unit project the display data without including the battery level display information.

3. The portable electronic apparatus according to claim 1, further comprising
a wireless communication unit that carries out wireless communications, wherein
the self-state information includes wireless connectivity information indicative of wireless connectivity of the wireless communication unit, and
the control unit makes the display unit display the display data including the wireless connectivity information and makes the projector unit project the display data without including the wireless connectivity information.

4. The portable electronic apparatus according to claim 1, further comprising
an operating unit that is key-operated by a user, wherein
the self-state information includes soft-key display information indicative of an operation available in the operating unit, and
the control unit makes the display unit display the display data including the soft-key display information and makes the projector unit project the display data without including the soft-key display information.

5. The portable electronic apparatus according to claim 1, wherein
the storage unit further includes a superposition memory unit that forms the display data combined by superposing at least a part of the display data stored in the display memory unit to be displayed on the display unit and/or to be projected by the projector unit, and
the control unit makes the projector unit project the display data stored in the superposition memory unit.

6. The portable electronic apparatus according to claim 5, wherein
the control unit makes the projector unit project the display data stored in either the main-memory unit or the superposition memory unit selected by a user.

7. The portable electronic apparatus according to claim 1, wherein
the control unit updates the display data projected by the projector unit when the display data stored in the main-memory unit is updated while the display data is being projected by the projector unit, and
the control unit does not update the display data projected by the projector unit even if the self-state information stored in the sub-memory unit is updated without the display data stored in the main-memory unit being updated.

8. The portable electronic apparatus according to claim 1, further comprising
a wireless communication unit that carries out wireless communications, wherein
the self-state information includes wireless connectivity information indicative of wireless connectivity of the wireless communication unit, and
the control unit does not change the display data projected by the projector unit even if the wireless connectivity information stored in the sub-memory unit is updated by a change in the wireless connectivity of the wireless communication unit into within or out of service range while the display data is being projected by the projector unit.

9. The portable electronic apparatus according to claim 1, further comprising
an open/close detection switch that detects a variation in an open/closed state of the portable electronic apparatus, and
an operating unit that is key-operated by a user, wherein
the self-state information includes soft-key display information indicative of an operation available in the operating unit,
the control unit changes the soft-key display information stored in the sub-memory unit when the variation in the open/closed state is detected by the open/close detection switch, and the control unit does not change the display data projected by the projector unit even if the soft-key display information stored in the sub-memory unit is changed by the variation in the open/closed state being detected by the open/close detection switch while the display data is being projected by the projector unit.

10. The portable electronic apparatus according to claim 1, further comprising a power supply unit that supplies power and a sub-memory unit, wherein the self-state information includes battery level display information indicative of a remaining amount of the power of the power supply unit, and the control unit makes the projector unit project the display data including the updated battery level display information when the battery level display information stored in the sub-memory unit is updated by fluctuation in the remaining amount of the power of the power supply unit while the display data is being projected by the projector unit.

11. The portable electronic apparatus according to claim 1, wherein the storage unit includes a projection destination selection table that stores therein projection destination selection information in which a projection destination of the display data is set to either the display unit or the projector unit, or to both of the display unit and the projector unit, and the control unit causes the display data to be displayed on the projection destination set in the projection destination selection information stored in the projection destination selection table.

12. The portable electronic apparatus according to claim 1, wherein resolution of the display unit and resolution of the projector unit are different from each other, the display unit has a wide area including a larger number of pixels at least in one direction than the projector unit, and the control unit causes the self-state information to be displayed on at least a part of the wide area of the display unit.

13. The portable electronic apparatus according to claim 3, wherein the wireless communication unit carries out wireless communications in a CDMA 2000_1x system.

14. A display control method executed in a portable electronic apparatus comprising a display unit, a projector unit, a storage unit, and a control unit, the display control method including:

under control performed by the control unit, storing display data including at least self-state information indicative of a state of the portable electronic apparatus in the storage unit, displaying on the display unit the display data stored in the storage unit including the self-state information; and projecting by the projector unit the display data stored in the storage unit without including the self-state information, wherein the displaying includes displaying a first image corresponding to a second image to be projected by the projector unit in a first area in the display unit and displaying the self-state information in a second area in the display unit, and wherein the display method control further includes:

forming the display data to be displayed and/or projected on the display unit and/or by the projector unit by a display memory unit included in the storage unit, updating the self-state information as needed by a sub-memory unit included in the display memory unit, updating the display data other than the self-state information stored in the sub-memory unit by a main-memory unit included in the display memory unit and projecting by the projector unit the display data stored in the main-memory unit.

* * * * *